United States Patent
Denby et al.

(10) Patent No.: US 8,184,546 B2
(45) Date of Patent: May 22, 2012

(54) ENDPOINT DEVICE CONFIGURED TO PERMIT USER REPORTING OF QUALITY PROBLEMS IN A COMMUNICATION NETWORK

(75) Inventors: Lorraine Denby, Berkeley Heights, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 522 days.

(21) Appl. No.: 12/039,878

(22) Filed: Feb. 29, 2008

(65) Prior Publication Data

US 2009/0219825 A1 Sep. 3, 2009

(51) Int. Cl.
*G06F 11/00* (2006.01)
*H04J 1/16* (2006.01)
*H04L 1/00* (2006.01)

(52) U.S. Cl. ............... 370/250; 370/352; 370/401
(58) Field of Classification Search .......... 370/250, 370/351–356, 412, 401; 714/57, 47, 4
See application file for complete search history.

(56) References Cited

U.S. PATENT DOCUMENTS

| | | | | |
|---|---|---|---|---|
| 5,463,616 | A * | 10/1995 | Kruse et al. | 370/276 |
| 5,964,892 | A * | 10/1999 | Tang et al. | 714/38.1 |
| 6,651,183 | B1 * | 11/2003 | Gensler et al. | 714/4 |
| 6,823,482 | B2 * | 11/2004 | Ahrens et al. | 714/57 |
| 7,031,264 | B2 | 4/2006 | Adhikari et al. | |
| 7,333,514 | B2 * | 2/2008 | Anehem et al. | 370/474 |
| 7,450,908 | B1 * | 11/2008 | Bilder et al. | 455/67.11 |
| 2002/0150041 | A1 | 10/2002 | Reinshmidt et al. | |
| 2004/0062204 | A1 * | 4/2004 | Bearden et al. | 370/250 |
| 2004/0073641 | A1 * | 4/2004 | Minhazuddin et al. | 709/223 |
| 2004/0168109 | A1 * | 8/2004 | Ogura | 714/47 |
| 2004/0252646 | A1 | 12/2004 | Adhikari et al. | |
| 2005/0053009 | A1 | 3/2005 | Denby et al. | |
| 2006/0098625 | A1 * | 5/2006 | King et al. | 370/352 |
| 2006/0203805 | A1 | 9/2006 | Karacali-Akyamac et al. | |
| 2007/0168195 | A1 | 7/2007 | Wilkin et al. | |
| 2008/0117820 | A1 * | 5/2008 | Miyazaki et al. | 370/234 |
| 2008/0175228 | A1 * | 7/2008 | Chang et al. | 370/352 |

OTHER PUBLICATIONS

U.S. Appl. No. 11/536,229 filed in the name of A. Adhikari et al. on Sep. 28, 2006 and entitled "Root Cause Analysis of Network Performance Based on Exculpation or Inculpation Sets."
U.S. Appl. No. 11/935,515 filed in the name of L. Denby et al. on Nov. 6, 2007 and entitled "Network Condition Capture and Reproduction."
ITU-T Recommendation P.800, "Methods for Subjective Determination of Transmission Quality," Aug. 1996, 37 pages.
ITU-T Recommendation G.107, "The E-Model, a Computational Model for Use in Transmission Planning," Mar. 2005, 26 pages.
C. Perkins et al., "RTP Testing Strategies," Network Working Group, RFC 3158, Aug. 2001, pp. 1-22.
J. Postel, "User Datagram Protocol," Internet Engineering Task Force (IETF) Request for Comments (RFC) 768, http://www.iett.org/rfc/rfc768.txt, Aug. 1980, pp. 1-3.

(Continued)

*Primary Examiner* — Chuong T Ho (57) ABSTRACT

An IP telephone or other endpoint device in a network is configured to support a reporting mode of operation that may be entered, for example, responsive to user entry of a report command via a user interface of the endpoint device. In one aspect, the endpoint device stores call information in one or more buffers. Responsive to an instruction to enter a reporting mode, the endpoint device sends contents of the buffer(s) to a report server over the network. The endpoint device may reinitialize the buffer(s) responsive to an instruction to leave the reporting mode.

18 Claims, 3 Drawing Sheets

OTHER PUBLICATIONS

H. Schulzrinne et al., "RTP: A Transport Protocol for Real-Time Applications," Internet Engineering Task Force (IETF) Request for Comments (RFC) 1889 http://www.ietf.org/rfc/rfc1889.txt, Jan. 1996, pp. 1-75.

* cited by examiner

ENDPOINT DEVICE CONFIGURED TO PERMIT USER REPORTING OF QUALITY PROBLEMS IN A COMMUNICATION NETWORK

FIELD OF THE INVENTION

The invention relates generally to communication networks, and more particularly to techniques for network monitoring and analysis.

BACKGROUND OF THE INVENTION

It is important to maintain acceptable Quality of Service (QoS) levels for real-time applications in a network. Such applications may include, for example, video streaming and Voice over Internet Protocol (VoIP) telephony. Network monitoring and analysis systems are commonly utilized to ensure that networks are meeting their QoS requirements. Such systems typically collect low-level network measurements, such as delay, jitter and packet loss. See, for example, U.S. Patent Application Publication No. 2005/0053009, entitled "Method and Apparatus for Automatic Determination of Performance Problem Locations in a Network," which is incorporated by reference herein, and discloses root cause analysis techniques for determining particular problem locations in a network comprising a plurality of endpoint devices.

Certain types of low-level network measurements made by a given network monitoring and analysis system may not be sufficient to allow the system to detect particular quality problems. For example, a particular quality problem experienced by a user on a VoIP call may not be attributable to delay, jitter, packet loss or similar low-level network measurements. Accordingly, a system which relies only on these low-level network measurements may be unable to detect the particular quality problem. Examples of quality problems that may not be reflected in low-level network measurements include problems associated with signaling, noise, echo, robotic voice, etc.

Network users typically have only very limited options for reporting a quality problem. For example, the users may be required to make voice or email contact with a customer support service of the network provider, which can be a time-consuming and frustrating process. A so-called "trouble ticket" may be generated and tracked as a result of such a contact. However, the typical processing of trouble tickets can lead to significant delay before the reported problem is addressed. Also, there may be a certain amount of delay between the time the user experiences the problem and the time the user contacts the customer support service. The network conditions that led to the reported quality problem may be intermittent, transient or otherwise difficult to characterize. Thus, the conventional approach is unable to determine the precise network conditions at or near the time the reported problem was experienced by the user. This makes it very difficult to resolve certain types of reported quality problems, such as those that are not reflected in low-level network measurements.

SUMMARY OF THE INVENTION

Illustrative embodiments of the present invention facilitate network monitoring and analysis by providing a mechanism by which a user can report quality problems via an endpoint device of the network.

In one aspect of the invention, an IP telephone or other endpoint device in a communication network is configured to support a reporting mode of operation that may be entered, for example, responsive to user entry of a report command via a user interface of the endpoint device. In one aspect, the endpoint device stores call information in one or more buffers. Responsive to an instruction to enter a reporting mode, the endpoint device sends contents of the buffer(s) to a report server over the network. The endpoint device then reinitializes the buffer(s). This reinitialization of the buffer(s) may be performed, by way of example, responsive to an instruction to leave the reporting mode.

The one or more buffers may comprise a pair of circular buffers, with one circular buffer used to store user interface events and signaling information, and the other circular buffer used to store voice information.

As indicated above, the instruction to enter the reporting mode may be received in the endpoint device responsive to user entry of a report command via a user interface of the endpoint device. More specifically, user entry of the report command may be implemented, for example, by pressing a designated report button on the endpoint device, by pressing a series of predetermined keys on a keypad of the endpoint device, or by activating an icon on a display of the endpoint device.

At least one of the instruction to enter the reporting mode and the instruction to leave the reporting mode may be received in the endpoint device from a call controller of the network. The call controller may be configured, for example, to alter an allocation of network resources to a call involving the endpoint device based at least in part on call information sent by the endpoint device to the report server in the reporting mode. The report server may be implemented, for example, as part of the call controller, or on a common processing platform with the call controller.

The report server may process the contents of the buffer(s) as received from the endpoint device to determine a root cause of a quality problem experienced at the endpoint device. The report server in determining the root cause of the quality problem experienced at the endpoint device may process the contents of the buffer(s) as received from the endpoint device with additional call information received from at least one additional endpoint device of the network, such as another IP telephone or a gateway or bridge of the network.

Advantageously, the present invention in one or more of the illustrative embodiments captures call information in real time and allows that information to be provided to a report server over a network in conjunction with user reporting of a quality problem. Such an embodiment allows a user to easily and quickly report a quality problem in a manner that captures call information at or near the actual time that the problem was experienced by the user. This approach considerably facilitates problem analysis and correction, even in those situations in which the quality problems are attributable to intermittent or transient conditions, or to conditions not reflected in low-level network measurements such as delay, jitter and packet loss.

DETAILED DESCRIPTION OF THE INVENTION

The invention will be illustrated below in conjunction with an exemplary communication network suitable for supporting Internet telephony applications. It should be understood, however, that the invention is not limited to use with any particular type of communication network, endpoint device configuration, or quality problem reporting steps. Those skilled in the art will recognize that the disclosed techniques may be used in any communication network application in which it is desirable to provide an improved mechanism for user reporting of quality problems or related conditions in a given network in a manner that facilitates problem resolution.

Moreover, the invention, although particularly well-suited for use in monitoring and analysis of VoIP traffic, also provides significant advantages in multimedia traffic applications or other flow-based real-time applications. The invention can thus be used with voice, video, multimedia or any other type of network traffic.

The term "packet" as used herein is intended to include not only IP packets but also other types of packets used in other packet-based communication protocols.

The term "call" as used herein is intended to be construed broadly so as to encompass Internet telephony communications, VoIP communications, Session Initiation Protocol (SIP) communications, multimedia communications, or other types of network traffic.

The terms "endpoint" and "endpoint device" are used interchangeably herein and are intended to include an origination or destination device associated with a given VoIP call or other type of communication. For example, a given endpoint device may comprise an IP telephone or other terminal device of the network.

It is to be appreciated that a given endpoint device need not be a terminal device of the network, and may comprise an internal network element such as, for example, a gateway, a bridge, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

It should also be noted that an endpoint device as that term is used herein may comprise not only an IP telephone, gateway, bridge, router, switch or other network element, but also an associated additional device such as a network tap or other external capture device arranged in close proximity to the IP telephone or other network element. Thus, at least a portion of the functionality described herein as being implemented in an IP telephone or other network element may be implemented in an associated network tap or other external capture device, with the IP telephone or other network element and its associated network tap or other external capture device collectively being considered an example of an endpoint device as described herein.

The term "measurement data" as used herein is intended to include, for example, jitter, loss, delay or other QoS-related statistics, associated analysis results determinable therefrom, as well as other types of data.

Figure 1:
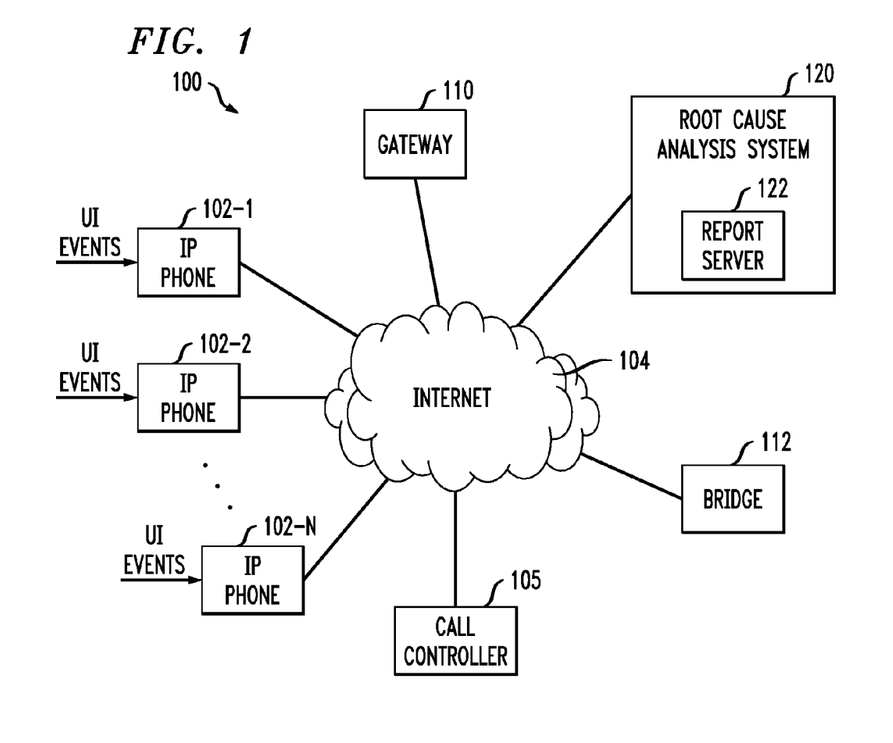
FIG. 1 shows an exemplary communication network in accordance with an illustrative embodiment of the invention.

FIG. 1 shows an illustrative embodiment of a communication network 100 in which the present invention is implemented. The network 100 includes an arbitrary number N of IP telephones 102-$i$, $i$=1, 2, ... N, which are configured to communicate over Internet 104. Other elements coupled to the Internet 104 in this embodiment include a call controller 105, a gateway 110, a bridge 112 and a root cause analysis system 120 comprising a report server 122.

The IP telephones 102 in this embodiment may comprise otherwise conventional wired or wireless IP telephones, including, for example, software-based devices commonly referred to as IP "softphones," in any combination, suitably modified to support a quality problem reporting function as will be described herein. In other embodiments, the endpoint devices may also or alternatively comprise other types of communication devices, such as personal digital assistants (PDAs), mobile cellular telephones, wireless email devices, personal computers (PCs), single-board computers (SBCs) or other types of processing devices. Conventional aspects of such endpoint devices are well-known in the art and therefore not described in further detail herein.

It should be noted that the IP telephones 102 are each typically configured to operate as both receiver and transmitter, as in the case of a bidirectional VoIP communication established between a given pair of such endpoint devices. These IP telephones operate responsive to user interface (UI) events, such as user entry of particular commands via a keypad or other user interface of the telephone.

Network 104 is illustratively shown as comprising the Internet, but in other embodiments may comprise, for example, other global communication networks, a wide area network, a metropolitan area network, a local area network, a wireless cellular network, a public switched telephone network (PSTN), or a satellite network, as well as portions or combinations of these or other communication networks.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietf.org/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

By way of example, VoIP communications carried over Internet 104 in FIG. 1 may comprise RTP voice data packets that are sent over an IP network using UDP. More particularly, the RTP packets are encapsulated in UDP packets which are themselves encapsulated in IP packets. Of course, a wide variety of protocols and encapsulation arrangements may be used in implementing the invention.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union—Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP calls or other communications in the context of the present invention may be implemented utilizing one or more of the above-cited protocols, or other suitable protocols, as will be readily apparent to those skilled in the art.

The call controller 105 may illustratively comprise a VoIP call controller, such as a controller configured with Avaya Communication Manager IP telephony software, commercially available from Avaya Inc. of Basking Ridge, N.J., USA.

Alternatively, the call controller 105 may comprise an otherwise conventional controller of a network monitoring and analysis system, implemented in or otherwise utilized in conjunction with the network 100, suitably modified to support user reporting of quality problems, as will be described in detail below.

Although call controller 105 is shown as a centralized controller in FIG. 1, this should not be construed as a requirement of the invention. The invention can alternatively be implemented using a distributed call controller, or using a combination of centralized and distributed call control techniques. In such embodiments, the functions of the call controller may be distributed at least in part across one or more of the endpoint devices or other network elements.

The term "controller" as used herein is therefore intended to include a centralized controller, a distributed controller, or a hybrid controller which is at least partially centralized and at least partially distributed.

The root cause analysis system 120 may include one or more features of a known network monitoring and analysis system, such as that described in the above-cited U.S. Patent Application Publication No. 2005/0053009. Other features of a network monitoring and analysis system that may be utilized in a given embodiment of the invention are disclosed in, for example, U.S. patent application Ser. No. 11/536,229, filed Sep. 28, 2006 and entitled "Root Cause Analysis of Network Performance Based on Exculpation or Inculpation Sets," and U.S. Pat. No. 7,031,264, issued Apr. 18, 2006 and entitled "Distributed Monitoring and Analysis System for Network Traffic," the disclosures of which are incorporated by reference herein. Such systems may be implemented at least in part in the form of software running on a computer or other processing device associated with the system 120, report server 122 or other element of the communication network 100 of FIG. 1. It should be understood, however, that the invention does not require the use of any particular type of network monitoring and analysis system, and may be implemented utilizing a wide variety of other network-based systems involving monitoring or analysis, or other similar functions.

The report server 122 may comprise, for example, a stand-alone computer or other processing element, or a portion of another processing element of the network 100, such as a portion of a given web server or set of servers accessible via Internet 104. In other embodiments, the report server may be incorporated into another network element, such as the call controller 105.

It should be emphasized that the exemplary configuration of the system 100 as shown in FIG. 1 is for purposes of illustration only, and should not be construed as limiting the invention to any particular arrangement of elements. For example, the system 100 may include additional endpoints, comprising other types and arrangements of routing elements, switching elements or other types of processing elements.

Figure 2:
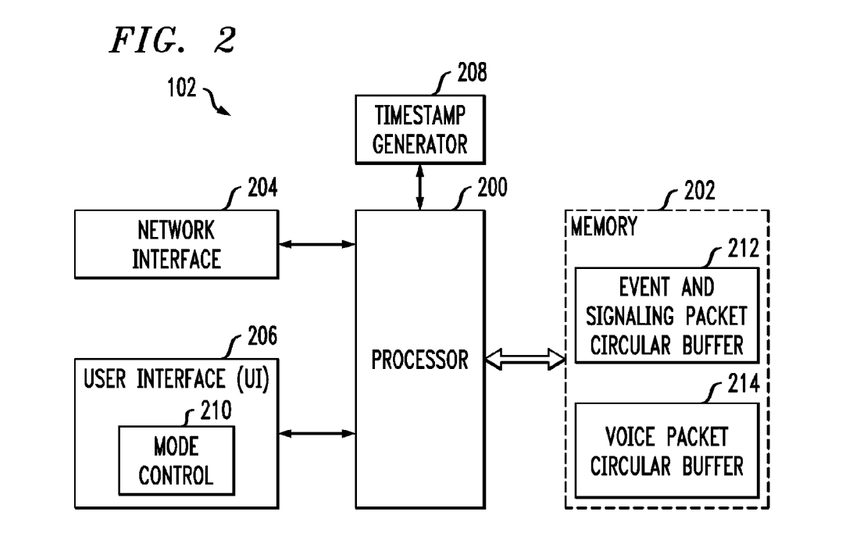
FIG. 2 is a block diagram showing one possible implementation of an endpoint device of the FIG. 1 network.

FIG. 2 shows one possible implementation of a given one of the IP telephones 102 in the FIG. 1 network. The IP telephone 102 as shown in the figure includes a processor 200 coupled to a memory 202 and a network interface 204. The techniques of the present invention may be implemented at least in part in the form of software storable in the memory 202 and executable by the processor 200. The processor 200 may comprise, for example, a microprocessor, an application-specific integrated circuit (ASIC), or other type of processing device(s), in any combination. The memory 202 may comprise, for example, random access memory (RAM), read-only memory (ROM), optical or magnetic disk-based storage, or other storage elements, as well as combinations of such storage elements. Such storage elements are examples of what are more generally referred to herein as processor-readable storage media. A given storage medium of this type will generally have encoded therein executable program code which when executed by processor 200 causes designated functions to be performed.

The IP telephone 102 as shown in FIG. 2 further includes a user interface 206 and a timestamp generator 208. A mode control element 210, for controlling the switching of the IP telephone between a reporting mode of operation and a non-reporting mode of operation, is implemented within the user interface 206. The non-reporting mode of operation may be a normal mode of operation, or any other mode of operation that does not involve reporting of call information as will be described below. A given embodiment of the invention may include multiple different reporting modes.

In processing VoIP calls, the IP telephones and other endpoint devices of network 100 typically send and receive two types of packets, namely, signaling packets and voice packets. In normal operation, the signaling packets are relatively infrequent and are sent and received at a low rate, while the voice packets are sent and received with regularity at a much higher rate. For example, when using a G.711 codec, there will typically be about 50 RTP packets per second and one RTCP packet every 5 seconds. The RTP packets in this example may be considered voice packets and the RTCP packets in this example may be considered signaling packets. Signaling packets as that term is used herein may include, again by way of example, any packets that may be used to set up or alter a call path.

The memory 202 of the IP telephone 102 includes, in addition to other storage elements not explicitly shown, a pair of circular buffers, including a first circular buffer 212 for storing user interface events and signaling packets, and a second circular buffer 214 for storing voice packets. A "circular buffer" as that term is used herein is intended to refer to a storage arrangement in which data is stored sequentially in order of arrival beginning with a first available storage location and continuing to a last available storage location. After the last available storage location is used, the next location used is the first location again, by overwriting the data previously stored in the first location. It is to be appreciated, however, that the present invention does not require the use of circular buffers, but can be implemented using other types of buffers.

Generally, the circular buffers 212, 214 are used to store two different types of call information that typically arrive at different rates, such as the above-noted voice packets, which arrive relatively frequently, and the above-noted user interface events and signaling packets, which arrive relatively infrequently. The use of two separate buffers for different types of call information ensures that higher-rate information does not quickly consume all of the available buffer storage space, as both types of information may be useful in determining the root cause of a given problem. Other embodiments can use more than two different circular buffers for storing respective ones of more than two different types of call information.

In a normal mode of operation, the circular buffers 212, 214 are periodically overwritten and nothing is done with the data stored in them. However, when the IP telephone 102 enters a reporting mode, as will be described in greater detail below, the contents of the buffers are sent to the report server 122 for analysis.

Although only a single pair of buffers 212, 214 is shown in memory 202, this is by way of example only. Other embodiments may utilize a per-session circular buffer arrangement in which different sets of one or more buffers are utilized to store information relating to different call sessions involving the IP telephone 102. Although a given IP telephone 102 is typically involved in only a single session at a time, other network elements such as call controller 105, gateway 110 and bridge 112, may be involved in multiple sessions at any given time and hence it is preferable to configure such devices with per-session buffers.

The FIG. 2 arrangement is considerably simplified for purposes of illustration. For example, a given IP telephone 102 may include a number of additional elements, including conventional elements typically associated with such a device. The conventional elements may include, for example, codecs and other voice signal processing hardware or software elements.

Also, as indicated above, the IP telephone 102 may have an associated network tap or other external capture device associated therewith. In an embodiment of this type, portions of the IP telephone as shown in FIG. 2, such as the circular buffers 212, 214 and associated control or processing circuitry, may be implemented in the external capture device rather than in the IP telephone itself. Nonetheless, the IP telephone and its associated external capture device are collectively viewed as an example of an endpoint device as that term is used herein.

Other processing elements of the network 100, such as the controller 105, gateway 110, bridge 112, and report server 122, may each generally comprise a processor, a memory and a network interface of the type shown in FIG. 2.

As indicated above, the illustrative embodiment of the invention as implemented in the network 100 of FIG. 1 supports user reporting of quality problems via a given one of the IP telephones 102.

Figure 3:
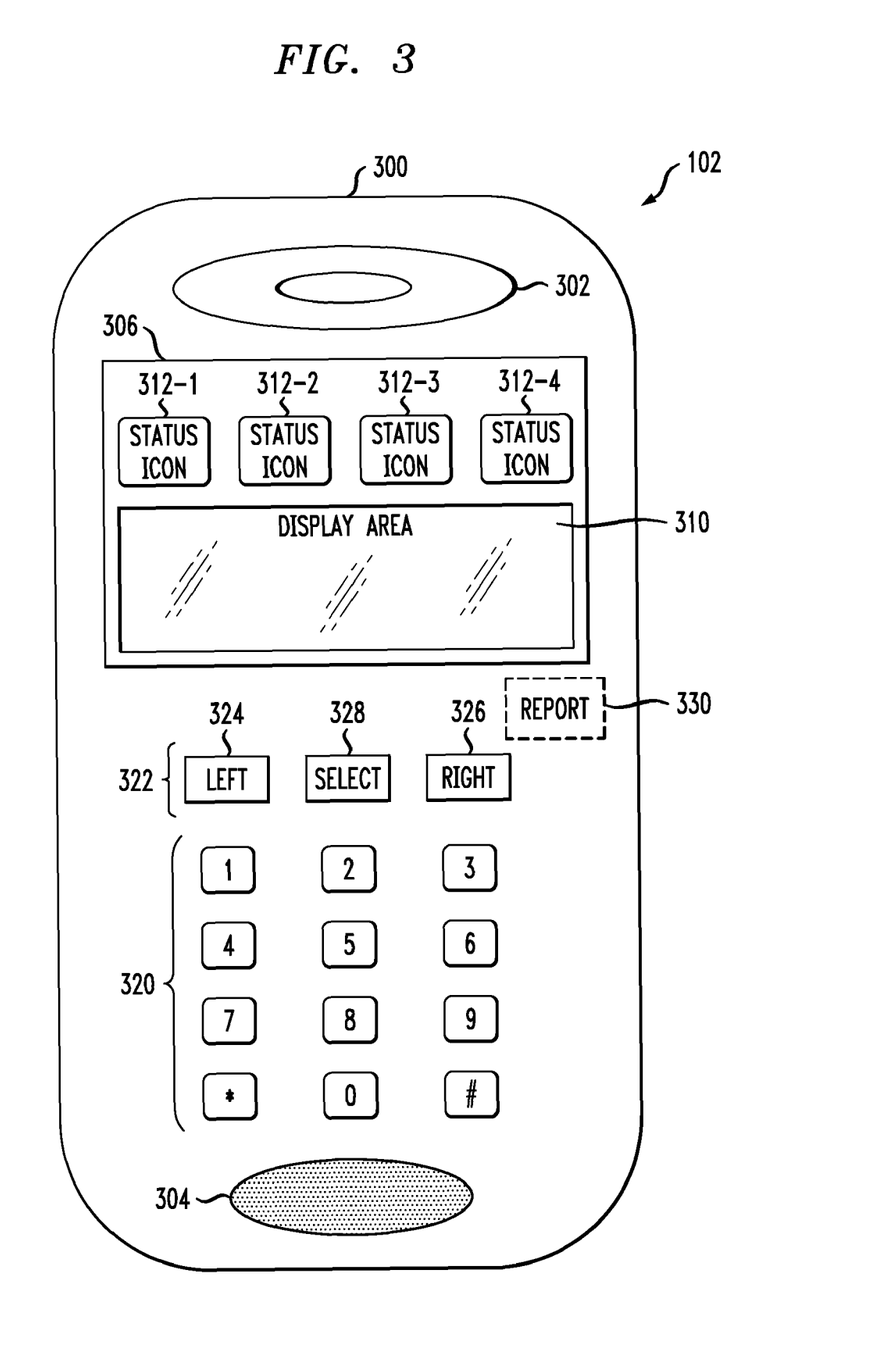
FIG. 3 shows an example of the endpoint device of FIG. 2 in the form of an IP telephone.

FIG. 3 shows one example of an IP telephone 102 of the network 100. This is an example of a wireless IP telephone, which may be configured to operate in a wireless network such as a cellular network, metropolitan area network, local area network, etc. Of course, the particular configuration shown is only an example, and a wide variety of other types of IP telephones may be used in implementing the present invention.

The IP telephone 102 as shown in FIG. 2 comprises a housing 300, an earpiece 302, a microphone 304 and a viewable portion 306 of a user interface. The viewable portion 306 of the user interface comprises a display area 310 and a number of status icons 312-1, 312-2, 312-3 and 312-4, each of which may indicate corresponding states or operating modes of the IP telephone, such as power on, reporting mode, non-reporting mode, etc. The user interface further includes a keypad 320, and navigation buttons 322. The latter more specifically include a left button 324, a right button 326, and a select button 328. The navigation buttons 322 may be used, for example, to control movement of a cursor and associated selection of displayed items presented in the display area 310. Also included in the IP telephone 102 is an optional report button 330, which if present allows a user to report a quality problem to the network by simply pressing that button. This user reporting function may alternatively be provided by, for example, pressing a series of predetermined keys on the keypad 320, or activating an icon presented in the display area 310 using the navigation buttons 322.

Figure 4:
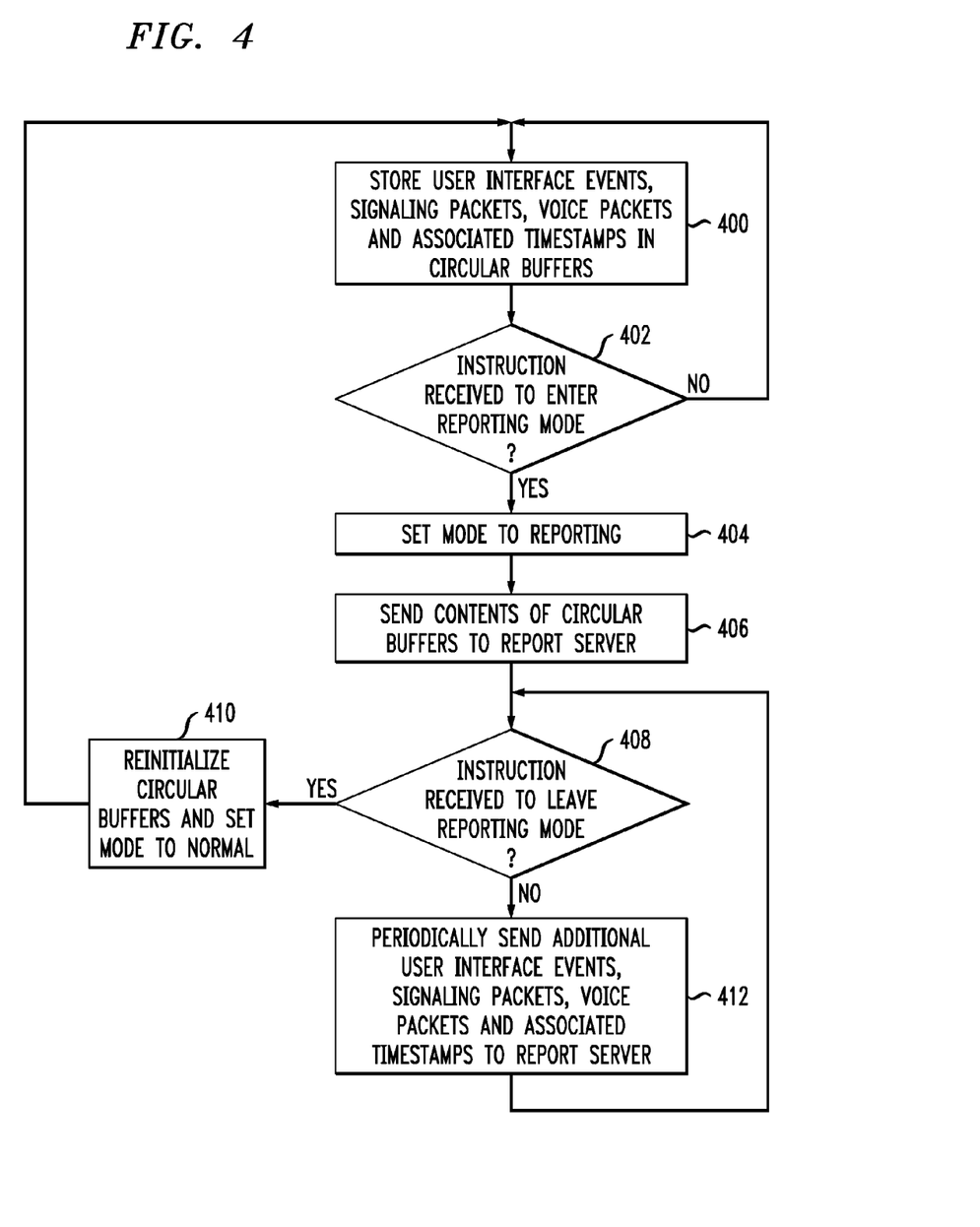
FIG. 4 is a flow diagram of a quality problem reporting process of the FIG. 1 network in an illustrative embodiment of the invention.

Referring now to the flow diagram of FIG. 4, an exemplary process flow associated with the user reporting of quality problems in network 100 is shown. The process includes steps 400 through 412 as shown, which are assumed to be performed in a given one of the IP telephones 102 as configured in the manner shown in FIGS. 2 and 3.

In step 400, user interface events, signaling packets, voice packets and associated timestamps are stored in the circular buffers 212, 214 of the IP telephone 102. A given VoIP call of the type described previously herein may be viewed as generally comprising signaling packets and voice packets. The signaling packets may comprise, for example, signaling information associated with UDP, IP, SIP, RTCP or other protocols as described above, while the voice packets may comprise, for example, RTP packets. Thus, in the present embodiment, signaling information is stored separately from the voice information. More specifically, the signaling information is generally stored in buffer 212 with the user interface events, while the voice information is stored in buffer 214. It will be assumed for the FIG. 4 process that these buffers comprise circular buffers. Use of separate buffers for signaling and voice information is preferable, as the latter information typically is sent and received at a much higher rate than the former and accordingly this approach ensures that useful signaling information and associated user interface events are not obscured by storage of large amounts of voice information. If separate buffers were not used, the voice information could quickly consume all of the available buffer space.

The user interface events, signaling packets or other types of signaling information, and voice packets or other types of voice information are examples of what is more generally referred to herein as "call information." Such call information in the present embodiment comprises information associated with a given VoIP call in the network 100.

The call information is stored in the buffers 212, 214 in association with respective timestamps that are indicative of arrival times of portions of that information in the IP telephone 102. For example, timestamps may be generated by the timestamp generator 208 for respective user interface events, signaling packets and voice packets that are input to the IP telephone 102. These timestamps are stored in the circular buffers in association with the information to which they refer. For example, the timestamps may be stored in the same storage locations as their respective user interface events, signaling packets or voice packets.

In step 402, the IP telephone 102 determines if an instruction has been received to enter a reporting mode of operation. Such an instruction may be received responsive to user entry of a report command via a user interface of the IP telephone. For example, as indicated previously, user entry of a report command may be implemented by pressing a designated report button 330 on the IP telephone, pressing a series of predetermined keys on the keypad 320, or activating an icon on a display 310 using navigation buttons 322. Such actions may be viewed as involving use of the mode control element 210 of FIG. 2. It is also possible that the instruction to enter the reporting mode may be received in the IP telephone 102 via network interface 204 from call controller 105, report server 220 or another element of the network 100. Similar arrangements may be used to cause the IP telephone to exit the reporting mode.

If step 402 determines that an instruction to enter the reporting mode has been received, the operating mode of the IP telephone 102 is set to reporting mode in step 404. Otherwise, the process returns to step 400 to continue to store user interface events, signaling packets, voice packets and associated timestamps in the circular buffers. In conjunction with entering the reporting mode in step 404, the IP telephone 102 in step 406 sends the contents of the circular buffers 212, 214 to the report server 122 over the Internet 104. In this embodiment, it is assumed that the entire contents of the buffers 212, 214 are sent in step 406. However, it should be noted that the sending of contents of the circular buffers in step 406 need not necessarily involve sending the entire contents of these buffers. For example, in certain circumstances it may be desirable to send only a portion of the contents, such as every other stored packet or unit of information, in order to conserve network bandwidth or to reduce the amount of time required to send the information over the network. Thus, a determination as to whether the entire contents should be sent or only a portion of such contents may be based on current network conditions, the type of problem being reported, or a variety of other factors.

After the IP telephone 102 has sent the contents of the circular buffers 212, 214 to the report server 122, it awaits instruction to leave the reporting mode of operation. In step 408, the IP telephone 102 determines if an instruction has been received to leave the reporting mode of operation. Again, such an instruction may be received responsive to user entry of an exit reporting mode command via a user interface of the IP telephone, or from call controller 105, report server 122 or another element of the network 100. It is also possible that the reporting mode may be configured such that it is automatically exited, for example, after a designated period of time, or after sending the contents of the circular buffers to the report server. In such arrangements, the instruction to leave the reporting mode may be an instruction generated internally by the IP telephone responsive to the expiration of a timer, the sending of the contents to the report server, or another triggering event.

If step 408 determines that an instruction to leave the reporting mode has been received, the circular buffers are reinitialized and the operating mode is set to normal, as indicated in step 410, after which the process returns to step 400 as shown. Otherwise, the process moves to step 412, wherein the IP telephone 102 periodically sends additional user interface events, signaling packets, voice packets and associated timestamps to the report server 122. Thus, step 412 is executed if the IP telephone 102 remains in the reporting mode.

The reinitialization of the buffers in step 410 may take any of a number of different forms. For example, a pointer used to indicate the next available storage location in a given buffer could be reset to point to the first storage location in the buffer. Other types of reinitializations may be used, such as, for example, providing an indication that previously-stored data is no longer valid while also indicating that only the buffer contents beyond a certain storage location should be reported in a subsequent reporting event. The term "reinitialize" as used herein is therefore intended to be broadly construed.

The additional information referred to in step 412 may be sent as it is received, that is, without first storing the information in one of the circular buffers 212, 214. Alternatively, such information may be stored in the circular buffers and sent at designated points in time, such as after each time the buffers reach a designated fullness level. From step 412 the process returns to step 408 to again determine if an instruction to leave the reporting mode has been received. Again, as indicated above, such an instruction may be based on timeout of a predetermined period of duration of the reporting mode.

The report server 122 processes the contents of the buffers 212, 214 as received from the IP telephone 102 to facilitate the determination of a root cause of a quality problem experienced at the IP telephone 102. This may involve, for example, the root cause analysis system 120 comparing the buffer contents as processed by report server 122 with those expected under the corresponding network configuration in effect at the designated times. Any of a number of known root cause analysis techniques could be used, including those described in the above-cited U.S. Patent Application Publication No. 2005/0053009 and U.S. patent application Ser. No. 11/536,229. Other types of monitoring or analysis could be used in place of root cause analysis, and the invention is not limited in this regard.

The root cause analysis system 120 in determining the root cause of the quality problem experienced at the IP telephone may process the contents of the buffers as received from the IP telephone 102 with additional call information received from at least one additional endpoint device of the network. This additional endpoint device may be, for example, another one of the IP telephones, or another network element such as gateway 110 or bridge 112. In such an arrangement, the additional endpoint device may be directed to send its associated call information to the report server 122 by the call controller 105. As another example, if the given IP telephone is communicating with another IP telephone when the former enters the reporting mode, the latter may automatically send its call information to the report server responsive to the former entering the reporting mode.

The call controller 105 may make use of the call information sent to the report server 122. For example, the call controller may be configured to alter an allocation of network resources to a call involving the IP telephone 102 based at least in part on the call information sent by that IP telephone to the report server in the reporting mode. More particularly, the call controller could allocate a different bridge, gateway or other network element to the call, in order to determine if such a change resolves the reported quality problem. Resource changes of this type could be repeated until a particular combination of resources is found that resolves the problem.

In other embodiments, the report server 122 could be implemented as part of the call controller itself, or on a common processing platform with the call controller, to facilitate their interaction.

It is to be appreciated that the particular arrangement of processing steps in FIG. 4 is presented by way of illustrative example only. Numerous alternative arrangements of processing steps may be used to support user reporting of quality problems via an endpoint device of a communication network.

The illustrative embodiments described above allow a user of a given IP telephone 102 to report the loss of quality using the telephone itself. Thus, the report can advantageously be made in real time during an on-going call. Such an approach facilitates the determination of the root cause of a given quality problem, particularly if the quality problem is not attributable to low-level network measurements such as delay, jitter or packet loss.

The buffer contents reported by the IP telephone to the report server may include measurement data that is generated from diagnostic tests that are launched responsive to entry of reporting mode. Such diagnostic tests could also or alternatively be launched by report server 122, call controller 105 or another network entity. The results of these tests may be used to facilitate the root cause analysis.

The circular buffers 212, 214 in the illustrative embodiments in effect allow the IP telephone 102 to keep at all times a complete log of the signaling and voice packets sent and received within, for example, the last few seconds. This log is only sent to the report server 122 when the IP telephone is instructed, by the user or otherwise, to enter the reporting mode of operation. As indicated above, the reporting of call information can continue for a predetermined period or until the user instructs the IP telephone to leave the reporting mode or otherwise indicates that the desired quality level has been restored.

The user interface may be configured to allow the user to specify in detail the particular type of quality problem that is being experienced. For example, different commands could be entered via the keypad 320 or different icons could be selected from a menu displayed in display area 310 in order to allow the user to report different types of quality problems. Examples of particular types of quality problems that may be indicated in this manner include signaling, noise, echo, robotic voice, etc. It is also possible for the IP telephone to be configured to prompt the user for a more detailed problem description once the user presses the report button 330, or enters a reporting mode command via the keypad 320 or navigation buttons 322.

As mentioned above, entry of a given IP telephone 102 into the reporting mode can cause other network elements to also enter their respective reporting modes. For example, in the case of a pair of IP telephones that are communicating directly with one another without going through a gateway, an arrangement also referred to as "shuffling," both telephones may enter a reporting mode. In the case of a pair of IP telephones that are communicating through a gateway such as gateway 110, which may involve using arrangements commonly referred to as "hairpinning," both the IP telephones and the gateway may enter a reporting mode for the corresponding session. In the case of a bridged call, the bridge 112 could also enter the reporting mode. In all of these cases, the call controller 105 could also be put in reporting mode.

It should be noted that a given network element such as gateway 110 or bridge 112 could be configured so as to store only signaling packets and not voice packets, in order to conserve storage space and processing time. Also, such an element could be permitted to enter reporting mode for only some designated maximum number of sessions at any given time. Finally, in order to prevent a network-wide reporting overload, transitions into the reporting mode could be entirely under the control of the call controller 105. In such an arrangement, the call controller receives a quality problem notification from an IP telephone 102, and sends instructions to enter reporting mode to that telephone as well as to the other network elements involved in the corresponding session. Such instructions may specify an amount of time that the IP telephone and other network elements are to remain in reporting mode. Alternatively, the call controller could leave the network elements in reporting mode until the corresponding session ends or until the user reports an end to the quality problem.

Due to privacy concerns, a given user may not want the voice information associated with a given call to be recorded. To accommodate such concerns, the IP telephone could be configured to support a number of different types of reporting modes, including one mode with recording of voice packets and another mode without recording of voice packets. The users that are parties to a given call could be prompted for permission to report voice packets or other voice information to the report server. If a given user refuses to grant the permission, summary audio statistics could be reported in place of the actual voice information.

The quality problem reporting of the illustrative embodiments may make use of a perceived quality estimation technique such as an estimated Mean Opinion Score (MOS) that conveys the overall perceived quality of a received stream on a scale from 1 to 5. See ITU-T Recommendation P.800, "Methods for subjective determination of transmission quality." For example, a given user upon pressing the report button 330 or otherwise indicating a desire to report a quality problem can be prompted for information that can be processed to generate an MOS. Such an arrangement may make use of the E-model described in ITU-T Recommendation G.107, "The E-model, a computational model for use in transmission planning." The E-model uses low-level network measurements to compute a scalar value known as an R-factor that can range from 0 to 100 and can be mapped to an estimated MOS. It is also possible for a given embodiment to generate a conversational estimated MOS that characterizes the concurrent perceived quality of received streams in two directions.

Other embodiments of the invention may make use of network condition capture and reproduction techniques such as those described in U.S. patent application Ser. No. 11/935,515, filed Nov. 6, 2007 and entitled "Network Condition Capture and Reproduction," which is incorporated by reference herein. One such technique captures measurement data characterizing network conditions at a given time between first and second endpoint devices of a network, and utilizes the captured measurement data in a network impairment device to reproduce the network conditions at a later time. The measurement data may comprise, for example, delay data generated from timestamps recorded in or near at least one of the endpoint devices. Such an approach allows network engineers to reproduce and experience for themselves the particular quality problems reported by users of network applications, thereby facilitating problem analysis and correction, even in those situations in which the quality problems are attributable to rare or transient network conditions.

The particular quality problem reporting techniques described above are exemplary only. Numerous other techniques may be used to trigger IP telephones and other network elements to enter a reporting mode of operation to report call information in real time during a given call. For example, a given trigger to enter a reporting mode of operation may be automatically generated based on detection of decreased signal-to-noise ratio, echo, robotic voice, etc. Other examples may involve detection of increased delay, jitter or packet loss. These and other detected conditions could be processed in a straightforward manner to generate a corresponding instruction for an endpoint device to enter a reporting mode of operation.

Responsive to detection of the root cause of a particular quality problem, various adjustments or modifications in the network may be made in order to alleviate or overcome the problem. A given embodiment of the invention may therefore provide such adjustments or modifications as determined based on call information supplied to a report server.

In a given embodiment, a reporting mode can be enhanced by triggering the acquisition of data that would not be collected under normal circumstances. For example, during the life of a given session, a call controller may exchange signaling data with endpoints and endpoints may exchange RTP packet streams. The particular routes followed by the various types of packets through the network infrastructure are often a critical aspect of performance. Accordingly, it may be advantageous to measure the network routes that are used for these communications whenever the corresponding endpoint or endpoints are in the reporting mode. This can be done using a process such as traceroute on IP networks. Such a process may be used continuously throughout the reporting mode so as to detect changes in the network routes, as such changes could be the root cause of poor performance.

As previously noted, one or more of the quality problem reporting functions described above in conjunction with the illustrative embodiments of the invention may be implemented in whole or in part in software utilizing processing elements such as processor 200 and memory 202 in the IP telephone 102, or similar elements in the call controller 105, gateway 110, bridge 112 or other network elements. A wide variety of other suitable arrangements of hardware, firmware or software may be used to implement the techniques of the invention.

It should again be emphasized that the above-described arrangements are illustrative only. For example, alternative embodiments may involve different arrangements of endpoint devices, controllers, gateways, bridges, or other network elements, different types of network traffic and call information, different types of buffers, different types of quality problem reporting mechanisms, etc. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:
   storing call information in a first buffer and a second buffer of an endpoint device that participates in a call over a network, wherein:
   (i) a user of the endpoint device is a party on the call, and
   (ii) the first buffer stores at least some of the voice packets of the call;
   transmitting, during the call, the contents of the first buffer and the second buffer to a report server when and only when the endpoint device receives an instruction from the user to enter a reporting mode;
   reinitializing the first buffer and the second buffer;
   entering a non-reporting mode by the endpoint device; and
   wherein the call is between the endpoint device and a second device, automatically entering, in response to the endpoint device entering the reporting mode, the reporting mode and transmitting to the report server contents of at least one buffer that comprises call information.

2. The method of claim 1 wherein the first buffer and the second buffer each comprises a plurality of per-session circular buffers that each is associated with a particular call session involving the endpoint device.

3. The method of claim 1 wherein a call controller on the network commands the endpoint device to enter the non-reporting mode.

4. The method of claim 3 wherein based at least in part on the call information received from the endpoint device, the call controller alters an allocation of resources in the network that are associated with the call.

5. The method of claim 1 wherein storing call information in the first buffer and the second buffer of the endpoint device further comprises storing an association between at least one portion of the call information and a timestamp that indicates an arrival time at the endpoint device of the respective at least one portion of the call information.

6. The method of claim 1 wherein the report server processes the information received from the endpoint device to determine a root cause of a quality problem experienced at the endpoint device.

7. The method of claim 6 wherein the report server determines the root cause of the quality problem based on (i) the call information received from the endpoint device and (ii) additional information received from at least one other device involved in the call.

8. The method of claim 1 wherein the endpoint device comprises one of an Internet Protocol telephone, a gateway and a bridge.

9. The method of claim 1 wherein:
   (iii) the second buffer stores at least one user interface event that is associated with the call.

10. The method of claim 1 further comprising:
    in response to a value of a measurement of the network that exceeds a threshold, the transmitting excludes the contents of the first buffer.

11. The method of claim 1 wherein the endpoint device enters the non-reporting mode after a pre-defined period of time that is independent of the duration of the call.

12. The method of claim 1 further comprising:
    when the endpoint enters the reporting mode, issuing a prompt for the user at the endpoint device to supply comments about the call; and
    storing the comments about the call in a third buffer in the endpoint device, wherein the comments about the call are associated with the call.

13. The method of claim 1 further comprising:
    calculating, by the endpoint device, an estimated mean opinion score based on the contents of the first buffer; and
    transmitting the estimated mean opinion score to the report server.

14. The method of claim 13 wherein the report server determines the root cause of a quality problem experienced at the endpoint device based at least in part on the estimated mean opinion score received from the endpoint device.

15. An apparatus comprising:
    an endpoint device in a network comprising a processor coupled to a memory that is tangible and non-volatile, wherein the endpoint device participates in a call over the network, and wherein a user of the endpoint device is a party on the call;
    the memory implementing a first buffer and a second buffer;
    the endpoint device being configured under control of the processor to store call information in the first buffer and the second buffer, wherein the first buffer stores at least some of the voice packets of the call;
    wherein in response to an instruction from the user during the call to enter a reporting mode, the endpoint device is configured under control of the processor to transmit, during the call, the contents of the first buffer and the second buffer to a report server;
    wherein the endpoint device is configured under control of the processor to reinitialize the first buffer and the second buffer and to enter a non-reporting mode; and
    wherein the call is between the endpoint device and a second device, automatically entering, in response to the endpoint device entering the reporting mode, the reporting mode and transmitting to the report server contents of at least one buffer that comprises call information.

16. The apparatus of claim 15 wherein the endpoint device comprises one of an Internet Protocol telephone, a gateway and a bridge.

17. A system comprising:
    at least one endpoint device in a network, wherein a first endpoint device participates in a call over the network, and wherein a user of the first endpoint device is a party on the call;
    at least one report server coupled to the network; and
    a call controller coupled to the network;

wherein the first endpoint device is configured to store call information in a first buffer and a second buffer, and wherein the first buffer stores at least some of the voice packets of the call;

wherein in response to an instruction from the user during the call to enter a reporting mode, the first endpoint device transmits, during the call, the contents of the first buffer and the second buffer to the report server;

wherein the first endpoint device reinitializes the first buffer and the second buffer and enters a non-reporting mode; and wherein the call is between the endpoint device and a second device, automatically entering, in response to the endpoint device entering the reporting mode, the reporting mode and transmitting to the report server contents of at least one buffer that comprises call information.

18. A method comprising:

storing, during a call, at least some of the payload of the call in a first circular buffer that is associated with an endpoint device that participates in the call, wherein a user is a party on the call, and wherein the first circular buffer stores exclusively payload-related information;

storing, during the call, at least some of the signaling information of the call in a second circular buffer that is associated with the endpoint device;

transmitting, during the call, the contents of the first circular buffer and the second circular buffer to a report server when and only when the endpoint device receives an instruction from the user to enter a reporting mode;

reinitializing the first circular buffer and the second circular buffer;

entering a non-reporting mode by the endpoint device; and wherein the call is between the endpoint device and a second device, automatically entering, in response to the endpoint device entering the reporting mode, the reporting mode and transmitting to the report server contents of at least one buffer that comprises call information.

* * * * *